United States Patent
Covington et al.

(10) Patent No.: US 7,296,392 B2
(45) Date of Patent: Nov. 20, 2007

(54) BELLOWS STRUCTURE FOR A COTTON MODULE BUILDER OR PACKAGER

(75) Inventors: Michael J. Covington, Bettendorf, IA (US); Timothy A. Meeks, Davenport, IA (US); Gary R. Gallens, Geneseo, IL (US); George H. Hale, Arlington, TN (US)

(73) Assignee: CNH America LLC, New Holland, PA (US)

( * ) Notice: Subject to any disclaimer, the term of this patent is extended or adjusted under 35 U.S.C. 154(b) by 285 days.

(21) Appl. No.: 11/093,844

(22) Filed: Mar. 30, 2005

(65) Prior Publication Data

US 2005/0217509 A1  Oct. 6, 2005

Related U.S. Application Data

(60) Provisional application No. 60/557,853, filed on Mar. 30, 2004.

(51) Int. Cl.
*A01D 46/08* (2006.01)

(52) U.S. Cl. .......................... 56/28; 100/214; 100/177

(58) Field of Classification Search ................ 460/119; 56/28, 16.6; 100/144, 177, 194, 203, 214
See application file for complete search history.

(56) References Cited

U.S. PATENT DOCUMENTS

| | | | |
|---|---|---|---|
| 3,473,465 A | 10/1969 | Tonjum | 100/194 |
| 3,736,864 A | 6/1973 | Bottas et al. | 100/53 |
| 3,756,143 A | 9/1973 | Hennells | 100/53 |
| 3,826,070 A * | 7/1974 | Wood | 56/344 |
| 3,863,561 A | 2/1975 | Karls | 100/53 |
| 4,341,423 A * | 7/1982 | Fachini et al. | 298/18 |
| 4,519,189 A * | 5/1985 | Fachini et al. | 56/16.6 |
| 4,930,297 A * | 6/1990 | Schlueter et al. | 56/16.6 |
| 4,942,719 A | 7/1990 | Fleissner | 53/436 |
| 5,220,866 A | 6/1993 | Mason, Jr. et al. | 100/221 |
| 5,556,338 A * | 9/1996 | Covington | 460/119 |
| 5,609,523 A * | 3/1997 | Ringwald et al. | 460/119 |
| 5,616,077 A * | 4/1997 | Covington et al. | 460/119 |
| 6,366,210 B2 * | 4/2002 | Lemke | 340/665 |
| 6,409,456 B1 * | 6/2002 | Horejsi et al. | 414/495 |
| 6,692,352 B2 | 2/2004 | Gerber et al. | 460/119 |
| 6,698,339 B2 | 3/2004 | Chont | 100/8 |
| 6,698,343 B2 | 3/2004 | Chassiboud | 100/191 |
| 2002/0088215 A1 * | 7/2002 | Horejsi et al. | 56/1 |

* cited by examiner

*Primary Examiner*—Árpád Fábián Kovács
(74) *Attorney, Agent, or Firm*—Michael G. Harms; John William Stader; Patrick M. Sheldrake

(57) ABSTRACT

Bellows structure for a cotton module builder or packager, for enclosing or covering slots or passages through walls of a cotton module builder, for preventing entry of cotton into the slots or passages, to allow free movement of cross members therethrough of apparatus for distributing and compacting cotton within the module builder. The bellows can include telescoping rigid members below the cross members, and more flexible bellows thereabove.

14 Claims, 14 Drawing Sheets

BELLOWS STRUCTURE FOR A COTTON MODULE BUILDER OR PACKAGER

This application claims the benefit of U.S. Provisional Application No. 60/557,853, filed Mar. 30, 2004.

TECHNICAL FIELD

This invention relates generally to a bellows structure for enclosing or covering slots through walls of a cotton module builder or packager, and more particularly, to bellows which prevent passage through, and compaction in, cotton in slots through walls of a cotton module builder or packager for movement of apparatus for distributing and compacting cotton within the module builder or packager.

BACKGROUND ART

Cotton harvesting machines having an on-board cotton module building capability, also known as a cotton packager, include a cotton compacting chamber in which the compacted cotton module is built, formed by a floor and upstanding walls. Supported within this cotton compacting chamber is cotton compactor apparatus supported for vertical upward and downward movement for compacting cotton received in the chamber into the lower region thereof, for forming the module. It is important for the thus formed cotton module to have a cohesive, unitary composition which will be free standing when unloaded from the cotton compacting chamber, and which will remain substantially intact when subsequently handled. In particular, it is desirable for the upstanding sides of the thus formed compacted cotton module to be firm and relatively smooth to facilitate the subsequent handling, and also the removal of the module from the compacting chamber.

As a result, it is desirable for the structure and driving apparatus supporting the compactor apparatus to be located outwardly or outside of the compacting chamber. Such support structure and driver apparatus could be located above the compactor apparatus. However, the overall height of cotton harvesting machines must be limited so as to be able to pass through storage building doorways and under bridges, utility lines, and other overhead obstructions when moving from field to field. Therefore, it is sought to provide support structure and actuating drivers outside of the side walls of the compacting chamber.

Reference in this regard, U.S. Pat. Nos. 6,530,199 and 6,536,197, wherein external driver apparatus for the movement of the compactor structure or apparatus include four fluid cylinders, arranged two on each side of the compacting chamber. Such cylinders are disclosed as being double cylinders, one of which is used to index the compactor apparatus upwardly as the height of the module is increased, and the other for moving the compactor apparatus downwardly from the indexed location against the cotton in the compacting chamber for compacting the cotton.

It is contemplated to provide supporting structure and drivers on the exterior sides or ends of a module builder or packager connected to compactor apparatus within the cotton compacting chamber of the module builder or packager, for effecting downward movement under pressure and upper movement of the compactor apparatus. To accomplish this, it is contemplated that structural members will extend through vertical slots in walls of the module builder or packager, connecting the external structure to the compactor apparatus within the compacting chamber. However, a problem that can arise is passage of cotton from the compacting chamber through the vertical slots or passages, and/or collection and compaction of the cotton in the slots, so as to inhibit movement of the connecting structure through the slots, and also removal of the compacted body of cotton or module from the chamber due to integration with the cotton compacted into the slots. Additionally, it is contemplated that the structural members extending through the slots may vary in orientation as a result of uneven movement and tilting of the compactor apparatus.

Thus, what is sought is structure for a compactor apparatus of a cotton module builder or packager including external support and driver elements, which provides the advantages and overcomes the problems set forth above.

SUMMARY OF THE INVENTION

What is disclosed is structure for compactor apparatus of a cotton harvester which provides the advantages and overcomes one or more of the disadvantages and problems set forth above.

According to a preferred embodiment of the invention, the compactor apparatus includes a frame to be disposed within the cotton compacting chamber of a cotton module builder or packager including one or more structural elements which are movable downwardly within the chamber against the cotton for compacting the cotton against the floor and walls of the chamber. The frame includes cross members, preferably at the front and rear ends of the chamber, which extend across the chamber and protrude outwardly therefrom through upwardly and downwardly extending slots or passages through the side walls defining the chamber. The ends of the cross members which protrude through the slots or passages on each side of the chamber are connected together by an exterior side structure so as to be jointly movable upwardly and downwardly within the slots or passages, such that the frame is correspondingly moved upwardly and downwardly within the interior of the compacting chamber. Importantly, to maintain the frame at a horizontal orientation within the compacting chamber, or at an orientation relative to the floor within a permissible range, the exterior side structure on each side of the compacting chamber is guided by at least one vertically extending guide member. The side structure and at least one guide member can include members cooperatively engageable during the movement of the side structure such as rollers or the like. The exterior side structure on each side of the compacting chamber is connected to the module builder by a suitable driver, such as a fluid cylinder or the like, for moving the exterior side structure, and the frame upwardly and downwardly as desired or required for compacting the cotton within the chamber.

The frame of the compactor apparatus located within the compacting chamber preferably includes, in addition to the structural elements for compacting the cotton, at least one cotton driver, such as an auger or the like, extending in a horizontal orientation, and actuatable for moving the cotton within the chamber for more evenly distributing it therein for forming a more even cotton module.

According to another preferred aspect of the invention, bellows are disclosed for disposition in slots through the walls of the cotton module builder or packager for operation in cooperation with cross members extending therethrough for prevent passage of cotton through the slots and compaction of cotton therein. The bellows can optionally include elements for connection to the compactor apparatus which allow some relative misalignment therebetween as a result of tilting movement of the compactor apparatus. Below the compactor apparatus, in the region of the compacting chamber in which the cotton is being compacted, the bellows have a rigid surface which faces the interior of the chamber, and is supported such that compacting forces will not compress or deform the bellows.

DETAILED DESCRIPTION OF THE INVENTION

Figure 1:
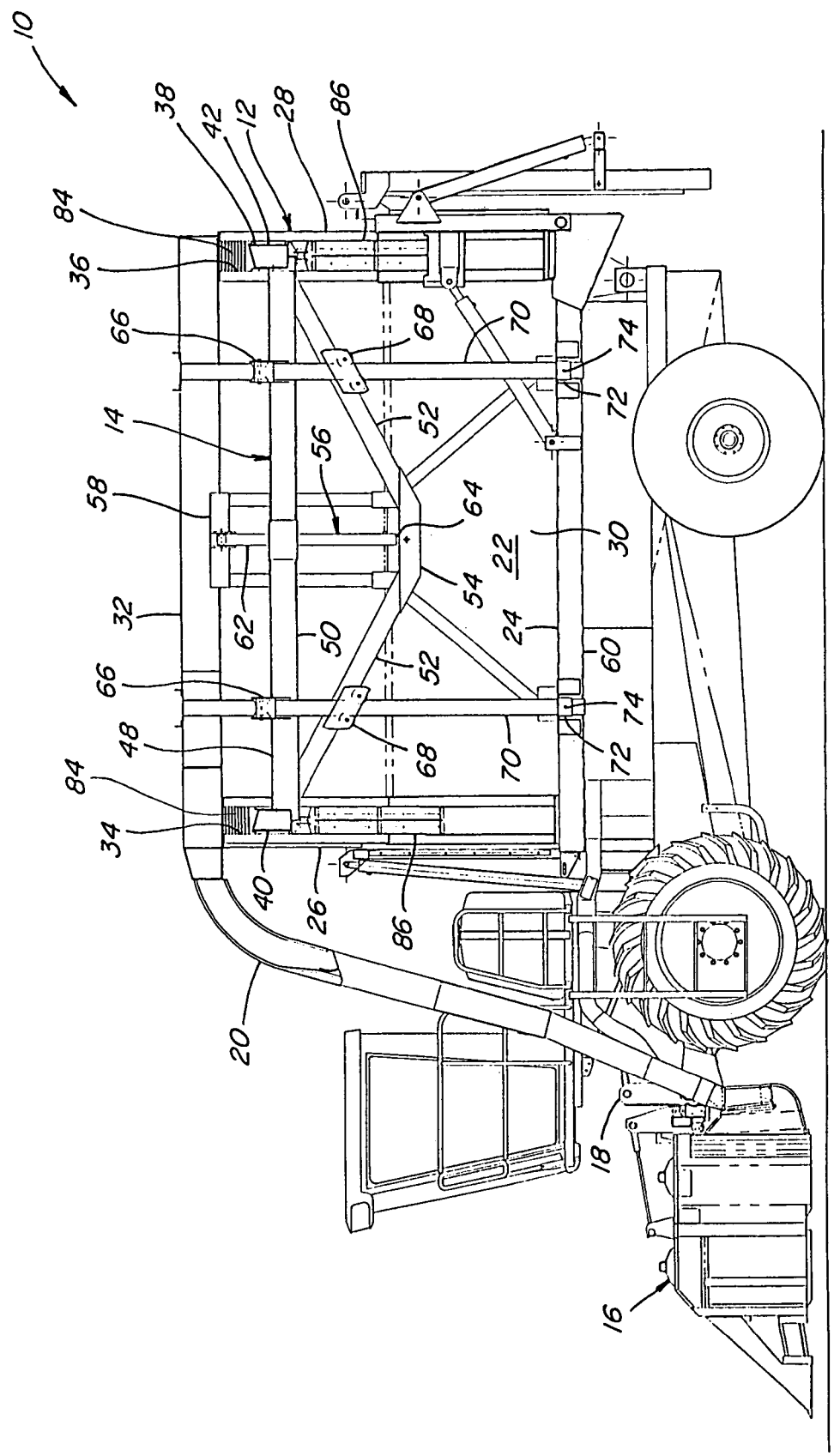
FIG. 1 is a side view of a cotton harvesting machine having an on-board cotton module builder including compactor apparatus according to the present invention thereon.

Referring now to the drawings, in FIGS. 1, 2, 3 and 4, a cotton harvesting machine 10 is shown, including an on-board cotton module builder 12, including compactor apparatus 14. Generally, cotton harvesting machine 10 is self-propelled for movement over a field of cotton plants, and includes a plurality of cotton harvesting units 16 extending in a side-by-side array across a front end 18 of machine 10. Cotton harvested by harvesting units 16 is conveyed by flows of air through ducts 20 which extend rearwardly and upwardly from harvesting units 16 to an upper region of a cotton compacting chamber 22 of module builder 12, in the well known conventional manner. The cotton conveyed into cotton compacting chamber 22 will then collect on a floor 24 within chamber 22, against which the cotton will be compacted by compactor apparatus 14, as will be explained.

Cotton compacting chamber 22 is a four-sided cavity defined on the bottom by floor 24 and upwardly extending opposing front and rear end walls 26 and 28, and side walls, represented by side wall 30, extending therebetween. Walls 26, 28 and 30 typically include openings or perforations therethrough, to allow passage and dissipation of the air used to convey the cotton into chamber 22, while retaining the cotton therein. The upper region of cotton compacting chamber 22 of module builder 12 is enclosed by a roof 32 which can also include openings or perforations for the passage of air but not cotton therethrough. Importantly, the side walls, as represented by side wall 30, each include a vertical forward slot 34 adjacent front end wall 26, and a vertical rearward slot 36 adjacent rear end wall 28, slots 34 and 36 extending substantially the entire vertical height of the compacting chamber.

Figure 4:
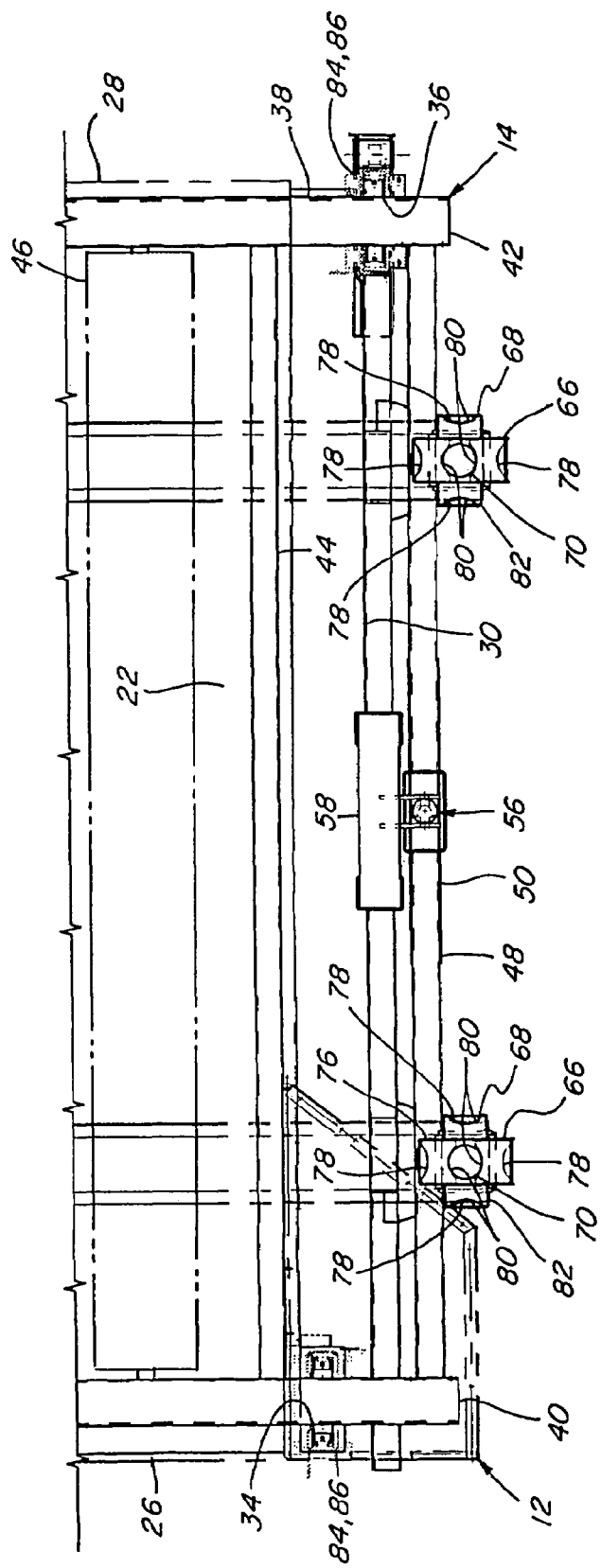
FIG. 4 is an enlarged fragmentary top view of the module builder and compactor apparatus.

Referring also to FIG. 4, compactor apparatus 14 of module builder 12 includes a compactor frame 38 which is generally horizontal and substantially entirely disposed within cotton compacting chamber 22, for movement downwardly against cotton contained therein for compacting the cotton against floor 24. Compactor frame 38 includes a front cross member 40 disposed in chamber 22 adjacent front end wall 26, and having opposite ends which extend through slots 34. Similarly, a rear cross member 42 is disposed in chamber 22 adjacent rear end wall 28 and has opposite ends extending through slots 36. A plurality of front and rear extending members 44 extend between and connect front and rear cross members 40 and 42. Additionally, preferably at least one, and most preferably, several augers 46 are supported for rotation on front and rear cross members 40 and 42, and extend forwardly and rearwardly therebetween. Augers 46 can be rotated using any suitable commercially available drivers, such as a gear drive driven by a motor such as a fluid or electric motor, or directly by fluid or electric motors, as desired, for distributing the collected cotton in chamber 22 as required or desired. In this regard, it is particularly desirable to distribute the cotton evenly with respect to the plane of floor 24, such that the resultant compacted cotton module will have a substantially uniform height along its length and width.

Compactor frame 38 of compactor apparatus 14 is supported in compacting chamber 22 on each side by an exterior side structure 48, each structure 48 including a substantially horizontal, forwardly and rearwardly extending main beam 50 which extends between and connects front and rear cross members 40 and 42. Each side structure 48 additionally includes a pair of braces 52 which extend downwardly and at converging angles from front and rear cross members 40 and 42, and which are connected together by a gusset 54 located spacedly below about the middle of main beam 50. Here, it should be noted that compactor frame 38 located within compacting chamber 22 and exterior side structures 48 on the exterior of the side walls represented by side wall 30 are movable upwardly and downwardly together.

The upward and downward movement of exterior side structures 48 and compactor frame 38 is preferably achieved and controlled by drivers 56 extending, respectively, between gusset 54 of each exterior side structure 48 and a support frame 58 supported by and extending upwardly from a frame 60 of module builder 12. Drivers 56 each preferably comprise a fluid cylinder which receives fluid under pressure from a suitable pressurized fluid source, such as a fluid pump of machine 10, for moving exterior side structure 48, and thus compactor frame 38 of compactor apparatus 14, upwardly and downwardly as required or desired for performing a cotton distributing and/or compacting operation. Each driver 56 includes a fluid cylinder 62 connected to support frame 58 and a rod 64 connected to gusset 54 of exterior side structure 48.

Figure 2:
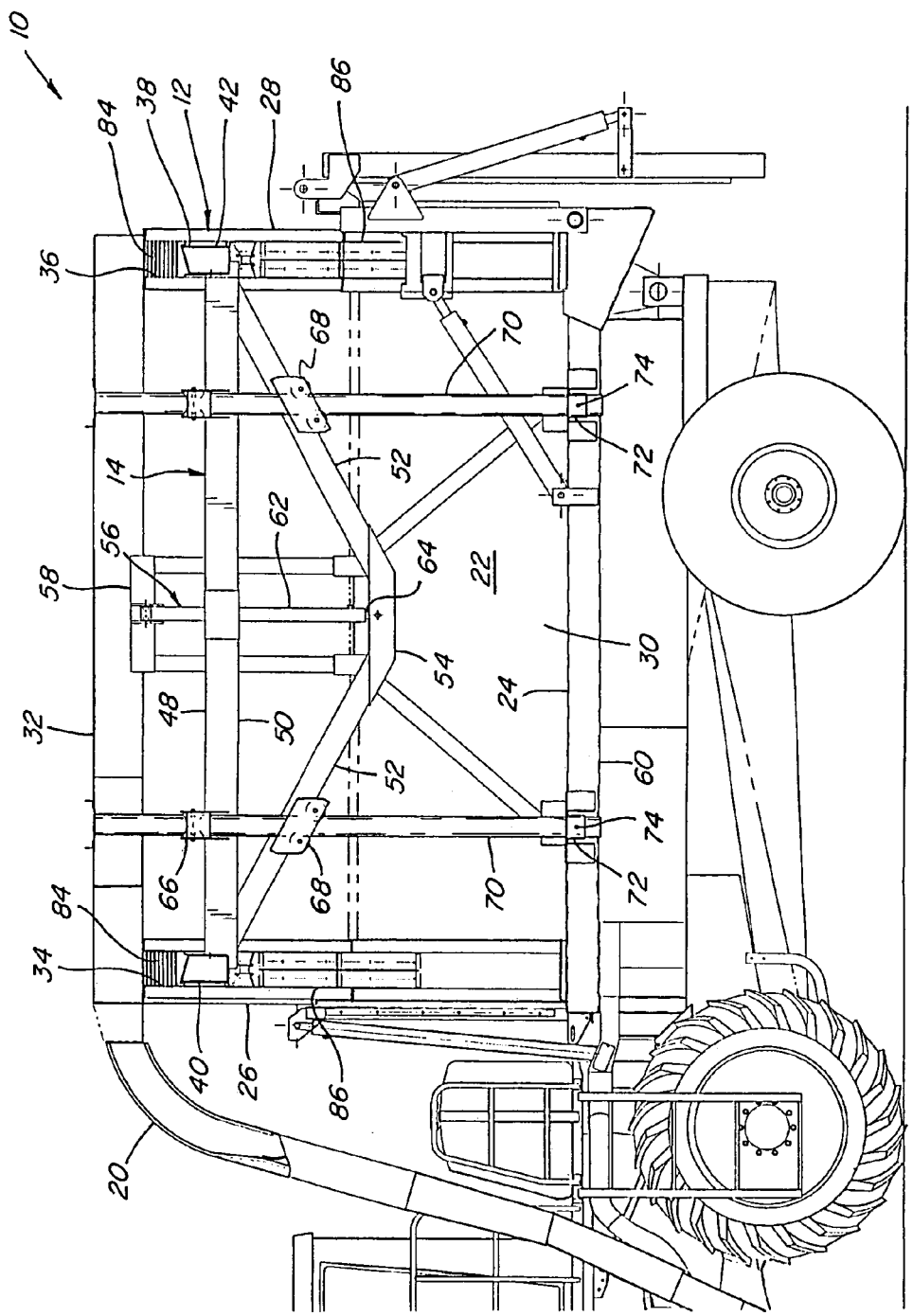
FIG. 2 is an enlarged fragmentary side view of the harvesting machine of FIG. 1 showing the compactor apparatus of the invention in an uppermost position.
Figure 3:
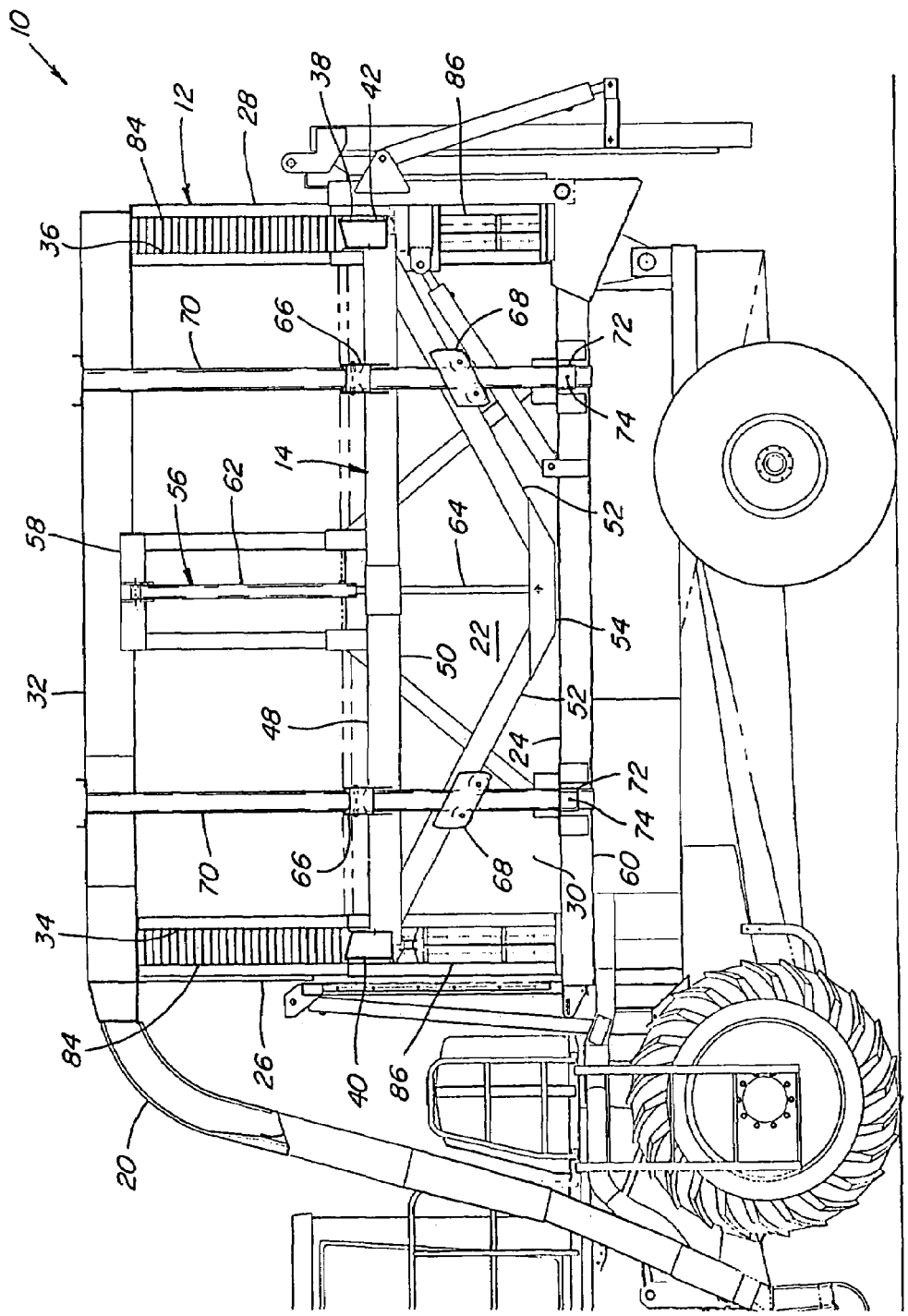
FIG. 3 is another enlarged fragmentary side view of the harvesting machine of FIG. 1 showing the compactor apparatus in a lowered, compacting position.

In FIGS. 1 and 2, rod 64 is shown in a retracted position in cylinder 62 such that exterior side structure 48 and compactor frame 38 are located at an elevated position. FIG. 3 shows rod 64 extended to a substantially extended position, to position side structure 48 and compactor frame 38 at a lowered position, representing about a maximum compacting position of compactor apparatus 14.

Figure 5:
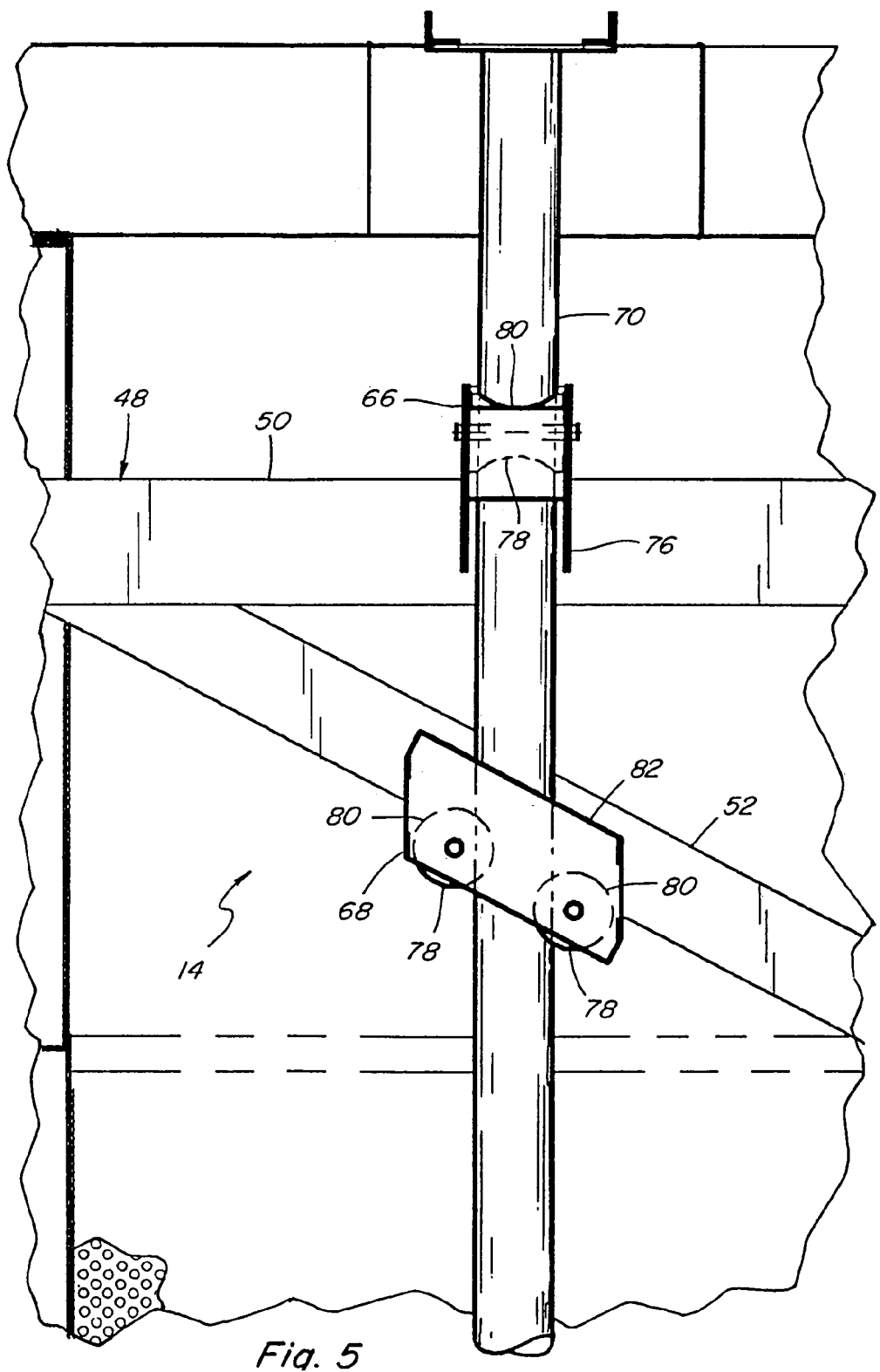
FIG. 5 is still another enlarged fragmentary side view of the module builder and exterior side structure and a guide member of the apparatus, showing rollers for controlling and guiding movement of the side structure along the guide member.

Referring also to FIG. 5, as noted above, it is a sought after feature of the present module builder 12 to form and produce complete cotton modules having a substantially uniform height over the front-to-rear and side-to-side extent thereof. Generally, the harvested cotton conveyed through ducts 20 into compacting chamber 22 will have a tendency to collect in the more rearward region of chamber 22, such that distribution in a forward direction by augers 46 is typically required. However, the cotton, even though more evenly distributed within chamber 22, can have various inconsistencies in density and other conditions which make various regions of the collected cotton more difficult or easy to compact relative to other regions. As a result, if the downward movement of compactor frame 38 is not restrained or controlled, compactor frame 38 can be tilted undesirably and lateral loads and stresses can be exerted against driver 56, both in the forwardly and rearwardly, and side-to-side directions.

To limit lateral loading, and facilitate the even distribution and compaction of the cotton within cotton compacting chamber 22 by compactor apparatus 14, each exterior side structure 48 includes upper guide roller assemblies 66, and lower guide roller assemblies 68, each of which rollingly engage and are movable upwardly and downwardly along vertical guide members 70 disposed at spaced locations adjacent each side of module builder 12, for controllably guiding the upward and downward movement of side structures 48 and compactor frame 38, for holding or maintaining compactor frame 38 in a substantial horizontal orientation as it compacts the cotton in chamber 22. Guide members 70 are fixedly mounted to frame 60 by brackets 72 which comprise sleeves which receive the respective guide members 70 and hold them in upstanding position and orientation beside module builder 12. Guide members 70 are fixedly mounted at the top to roof 32 of module builder 12. Each guide member 72 is preferably maintained in such upstanding orientation and position in bracket 72 by a pin 74, which can be removed to allow lowering guide members 70 with upper portions of module builder 12, for reducing the overall height of machine 10 for transport on trucks and rail cars, and other purposes as desired or required.

Each upper guide roller assembly 66 includes a bracket 76 mounted to main beam 50 of exterior side structure 48 and is of bifurcated or U-shaped construction so as to receive a guide member 70 therethrough. Bracket 76 supports a pair of rollers 78 for rotation about forwardly and rearwardly extending axes on opposite sides of guide member 70, for controlling or substantially limiting side-to-side movement of exterior side structure 48, and thus compactor frame 38. To facilitate contact between rollers 78 and guide member 70, rollers 78 each preferably has a concave outer surface 80 which engages the guide member 70.

Similarly, each lower guide roller assembly 68 includes a bracket 82 mounted to brace 52 of exterior side structure 48 and is of bifurcated or U-shape construction so as to receive a guide member 70 therethrough. Bracket 82 supports a pair of rollers 78 for rotation about side-to-side extending axis on opposite sides of guide member 70, for controlling or substantially limiting forward and rearward movement of exterior side structure 48, and thus compactor frame 38. To facilitate contact between rollers 78 and guide member 70, rollers 78 each preferably has a concave outer surface 80 which engages the guide member 70.

Figure 6:
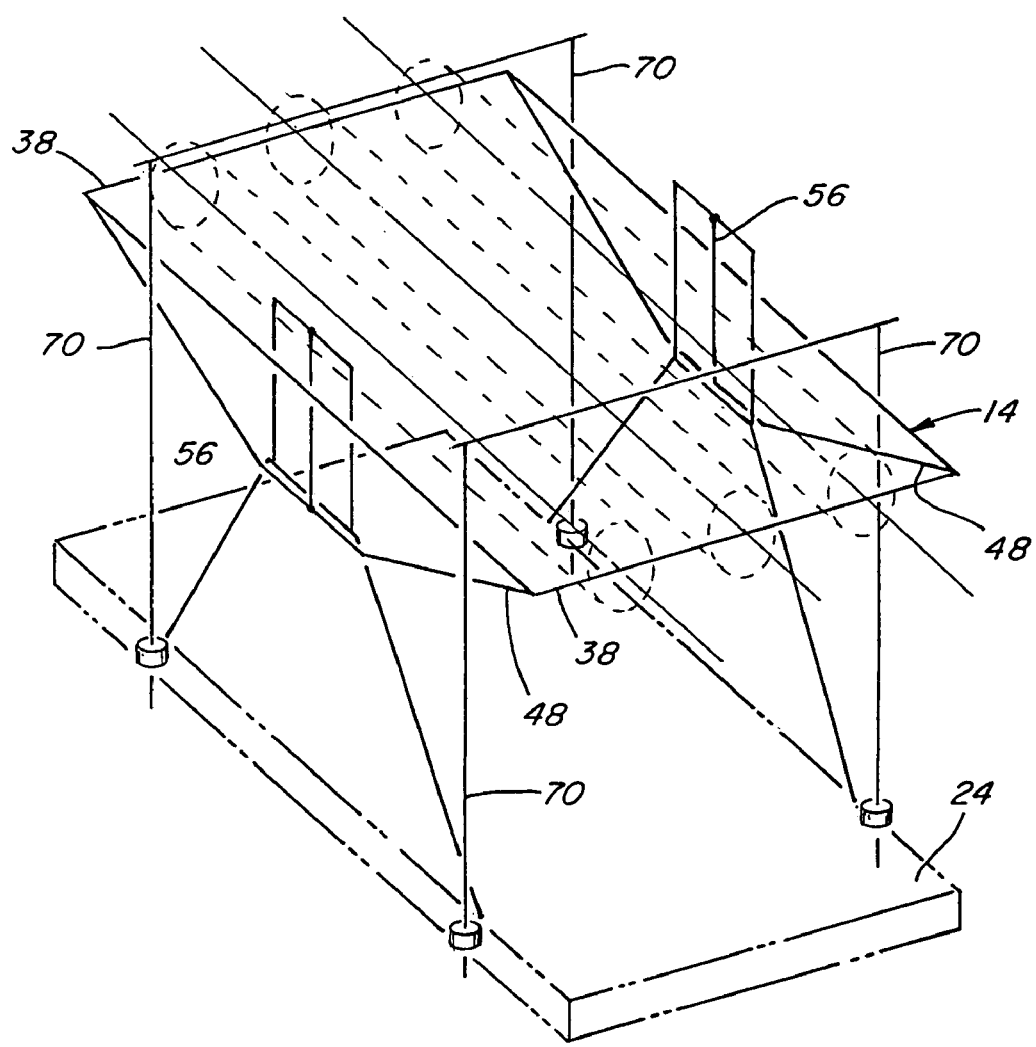
FIG. 6 is a simplified schematic perspective representation of the compactor apparatus of the invention in a raised position.

Referring to FIG. 6, a schematic representation of compactor apparatus 14 in a raised position above floor 24 is shown. Here, drivers 56 can be observed supporting exterior side structures 48 on opposite sides of compactor frame 38, and the positions of guide members 70 relative to exterior side structures 48 is evident.

Figure 7:
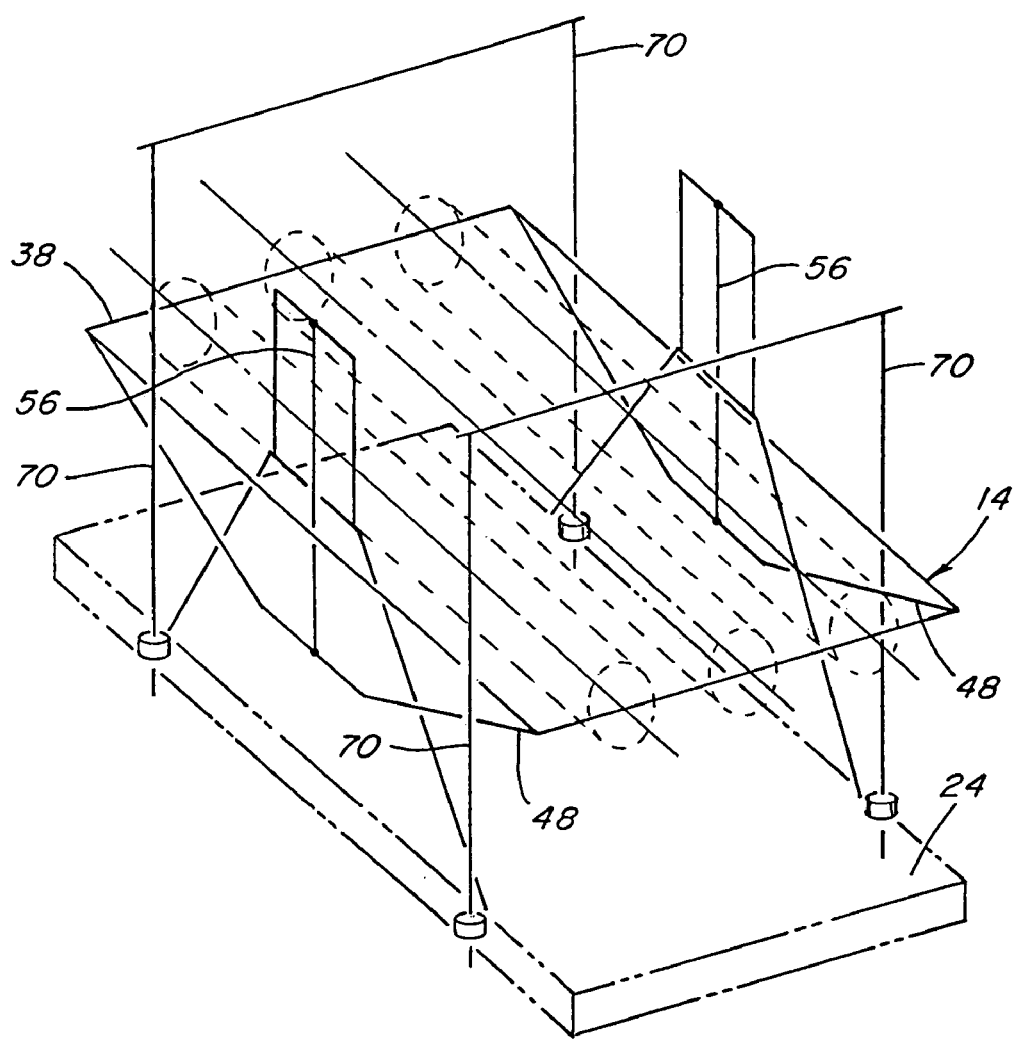
FIG. 7 is another simplified schematic perspective representation of the compactor apparatus of the invention in a lowered position.

FIG. 7 is a schematic representation showing compactor apparatus 14 in a lowered, compacting position, with compactor frame 38 supported by drivers 56 and exterior side structures 48. Again, the position of guide members 70 adjacent exterior side structures 48 is evident.

Referring again to FIGS. 1, 2, 3 and 4, to contain the cotton and prevent passage through and compacting of cotton in slots 34 and 36, each slot 34 and 36 includes an upper bellows 84 which encloses the slot above cross member 40 or 42, and a lower bellows 86 which encloses the slot beneath the cross member 40 or 42 constructed and operable according to the teachings of the present invention. Bellows 84 and 86 include elements movable with the respective cross member 40 and 42, and retractable and extendible elements for varying the height of the bellows during the movement of the cross member. Lower bellows 86 additionally include an interior surface which faces compacting chamber 22 which is of substantially rigid construction, to prevent the forces of compaction from forcing the cotton into the slot.

Figure 8:
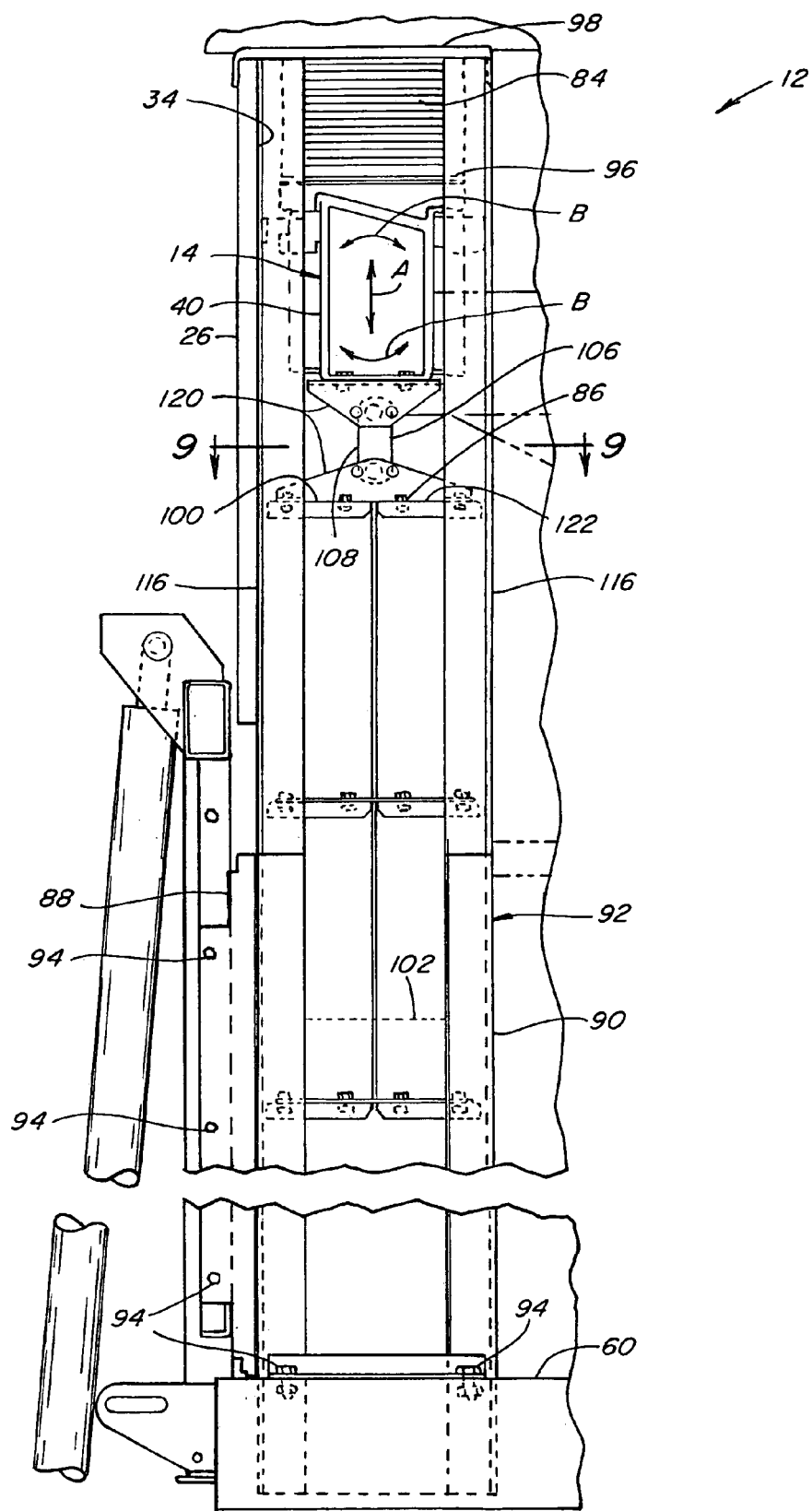
FIG. 8 is an enlarged fragmentary side view of the front end of the module builder, showing bellows according to the invention in the vertical slot of the module builder.

Referring also to FIG. 8, upper bellows 84 and lower bellows 86 in slot 34 at the front end of module builder 12 are shown, above and below front cross member 40 of compactor apparatus 14, respectively. Here, cross member 40 is shown at a raised position, representative of a non-compacting position, such that upper bellows 84 are in a compacted or retracted state, and lower bellows 86 are in an extended state. Each of bellows 84 and 86 are contained in and guided for vertical movement by a pair of opposing vertically extending C-shape channels 116 telescopically received in guide channel portions 88 and 90 of a guide frame 92 mounted in occupying relation to slot 34. Guide frame 92 is preferably mounted to frame 60 and front end wall 26 of module builder 12, by a plurality of conventional fasteners, here including conventional bolts 94. Upper bellows 84 preferably comprise commercially available bellows or way protectors, such as, but not limited to, those available under the Gortite tradename from A&A Manufacturing, Inc. of New Berlin, Wis., USA. Upper bellows 84 have a lower portion 96 which is attached or connected to cross member 40 for upward and downward movement therewith as denoted by arrow A, and an upper portion 98 suitably attached or connected to module builder 12 such as to roof 32 so as to remain stationary as cross member 40 is moved upwardly and downwardly, such that bellows 84 will expand during the downward movement, and contract or retract during the upward movement, respectively, to occupy and cover the space between opposing channels 116 to prevent passage of cotton therethrough and accumulation of cotton therein.

Lower bellows 86 are preferably of different construction than upper bellows 84, and instead include a rigid, box shape cover member 100 having a sectional extent when viewed from above only marginally smaller than the space defined between C-shaped guide channels 116 so as to be cooperatively slidable therebetween in covering relation to the space.

Figures 11, 12:
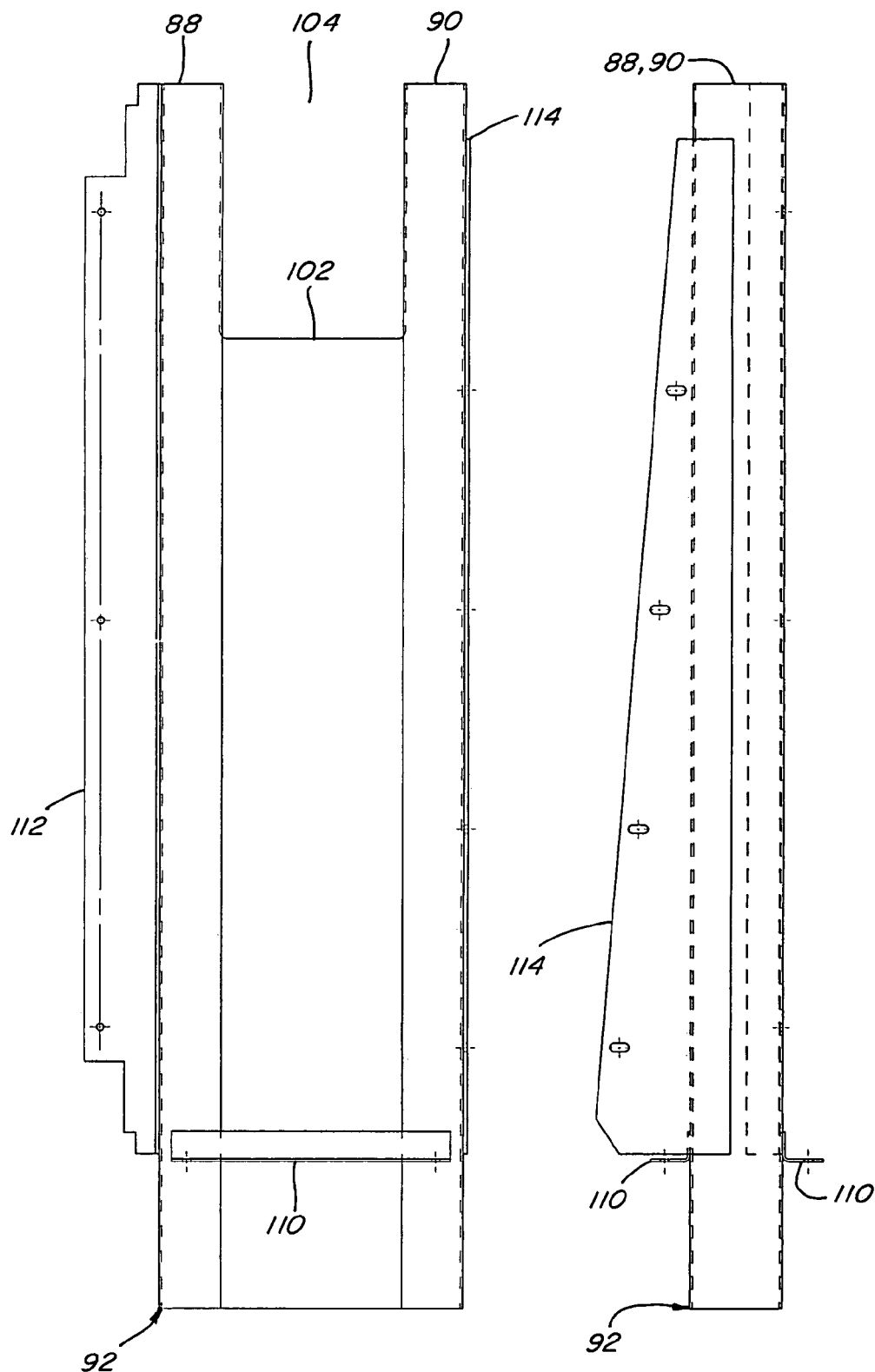
FIG. 11 is a side view of a guide frame of the bellows of FIG. 8.
FIG. 12 is an end view of the guide frame of FIG. 11.

Referring to FIGS. 11 and 12, guide channels 88 and 90 of guide frame 92 are connected by lower intermediate panel 102 on the side which faces cotton compacting chamber 22. Intermediate panel 102 is shorter in height compared to guide channels 88 and 90, to thereby form an opening 104 between the guide channels above intermediate panel 102. Cover member 100 and C-shaped channels 116 are telescopically received between guide channels 88 and 90, such that cover member 100 can slide up and down within C-shaped channels 116 that are contained within guide channels 88 and 90, between a position extending upwardly therefrom in covering relation to opening 104, and a lower position wherein all or a portion of cross member 40 will be located in opening 104. In this way, a rigid, pressure resistant structure is provided in covering relation to slot 34 which will prevent passage of cotton therethrough and entry of cotton therein during the compaction process.

Cover member 100 is preferably connected to a lower end of cross member 40 by a linkage arrangement 106 including a link 108 having an upper end pivotally connected to cross member 40, and a lower end pivotally connected to cover member 100. This is desirable as cross member 40 can be subjected to loadings which can cause it to tilt or rotate within the space between guide channels 88 and 90, as denoted by arrows B, which movements are not desired to be transferred to cover member 100. This is advantageous as it allows the front-to-rear extent and sideward extent of cover member 100 to be only marginally smaller between those extents of the space defined between opposing channels 116, such that there is less space therebetween for passage or collection of cotton.

Figure 9:
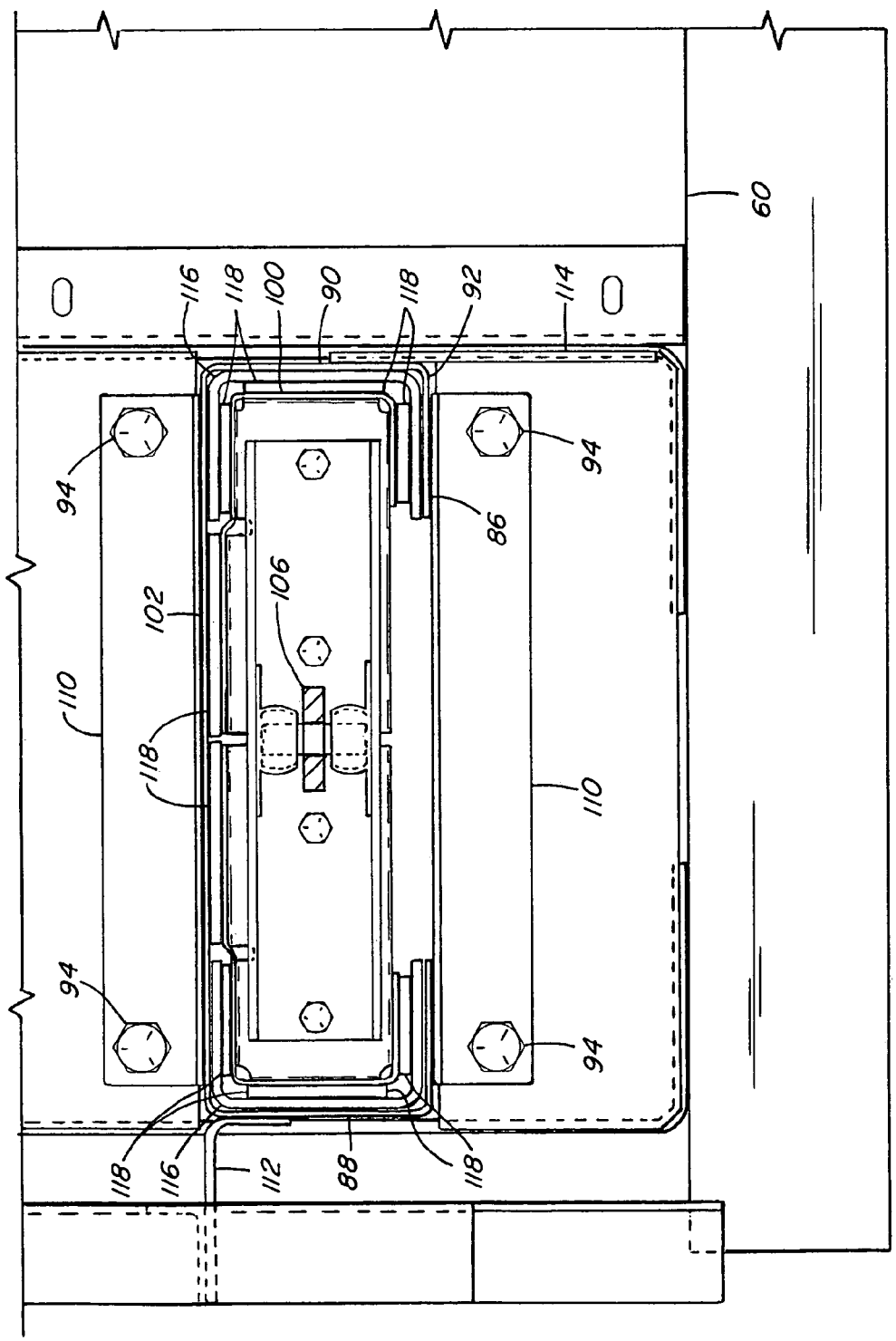
FIG. 9 is a sectional view along line 9-9 of FIG. 8.
Figure 10:
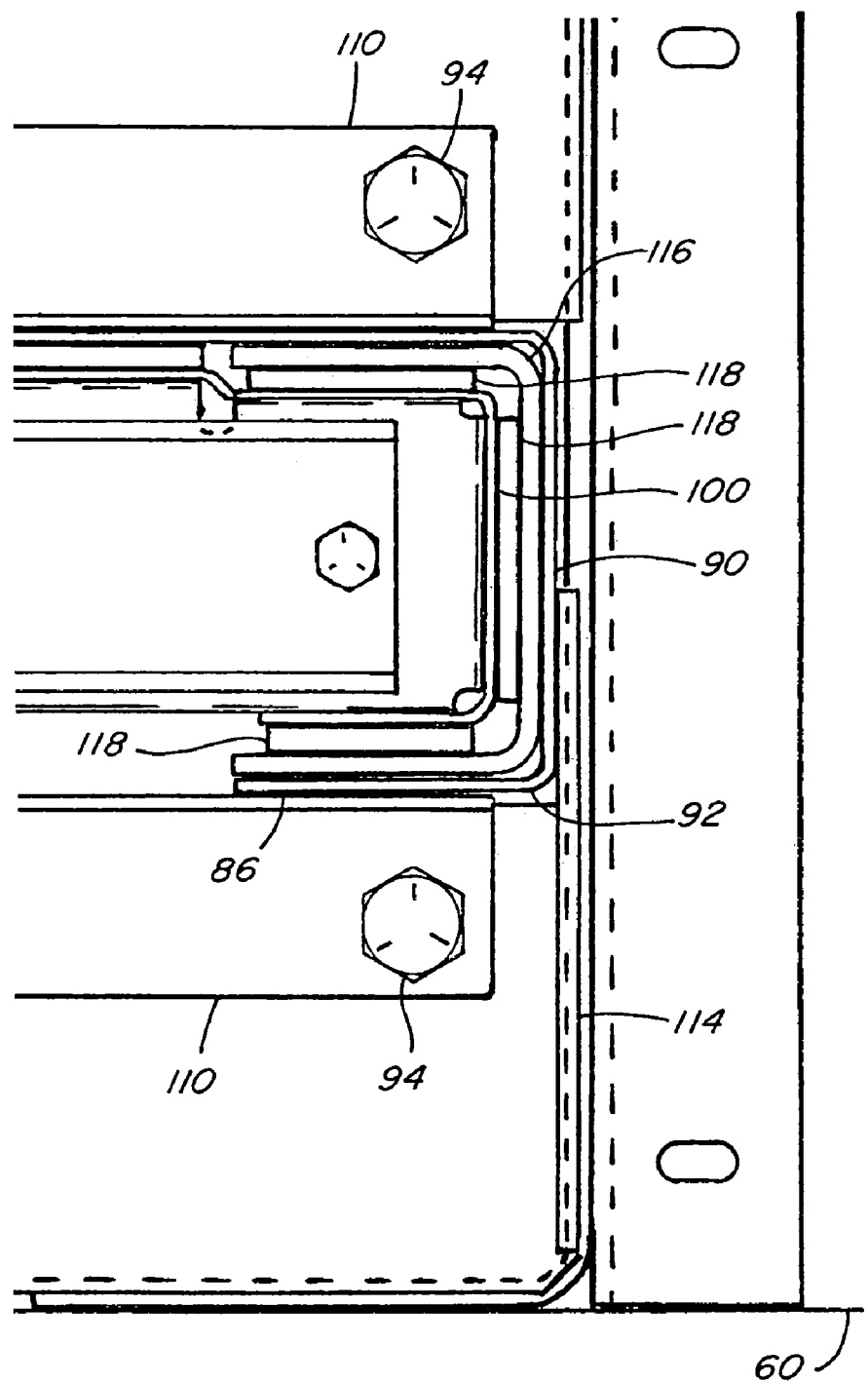
FIG. 10 is an enlarged fragmentary top view of the bellows of FIG. 8.

Referring also to FIGS. 9 and 10, which are each a top view of lower bellows 86, angle brackets 110 for attachment of guide frame 92 to frame 60 by bolts 94 is better shown. Angle brackets 112 and 114 for attachment to front end wall 26 at side wall 30 are also shown. C-shape channels 116 are also shown telescopically disposed within guide frame 92 and 88 at the opposite ends thereof and define the interface with cover member 100. As noted above, channels 116 also serve as guide channels for containing and guiding the upward and downward movement of upper bellows 84. Channels 116 can attach to roof 32 and move downwardly therewith, so as to be more telescopically received in guide frame 92 and 88 when roof 32 is lowered for transport.

Figure 13:
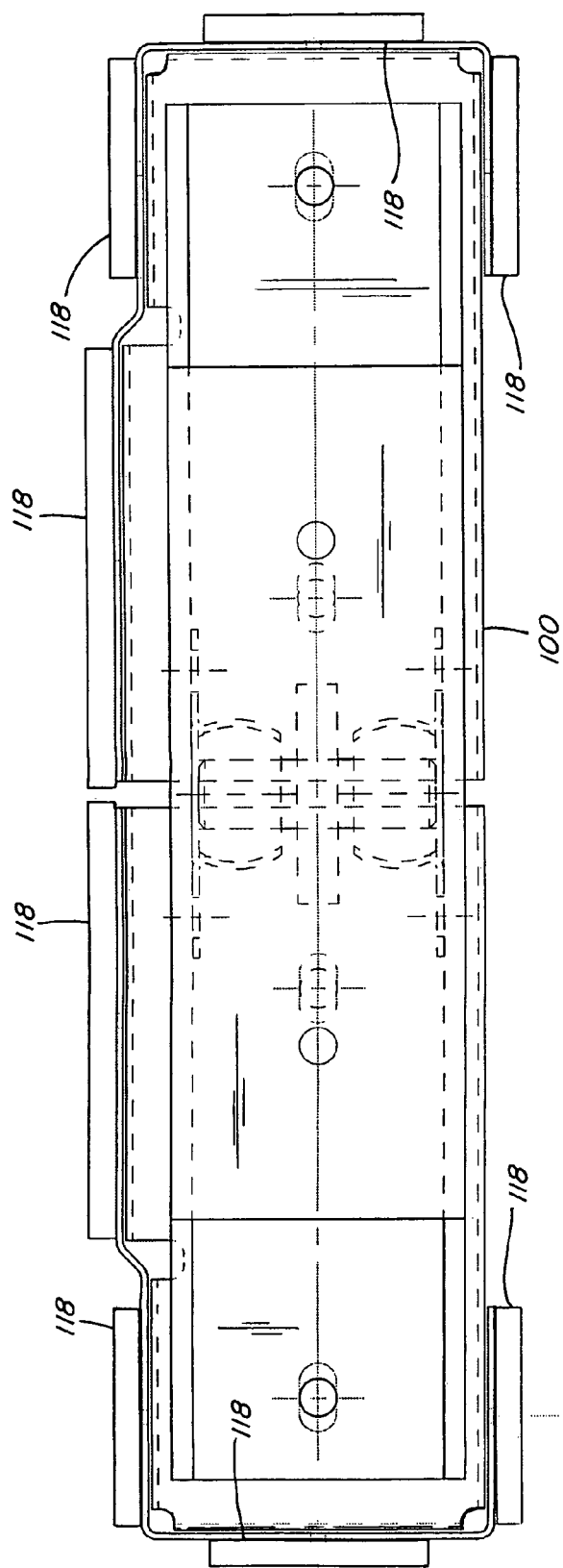
FIG. 13 is a top view of a cover member of the bellows of FIG. 8.

Referring also to FIG. 13, which is a bottom view of cover member 100, outer surfaces of that member which oppose inner surfaces of channels 116 and inner surface of 102 in guide support 92, include longitudinally extending strips 118 of a low friction polymer material to facilitate movement of member 100 in telescopic relation to channels 116 and guide frame 92, and also to block passage of cotton between member 100 and the other components.

Figure 14:
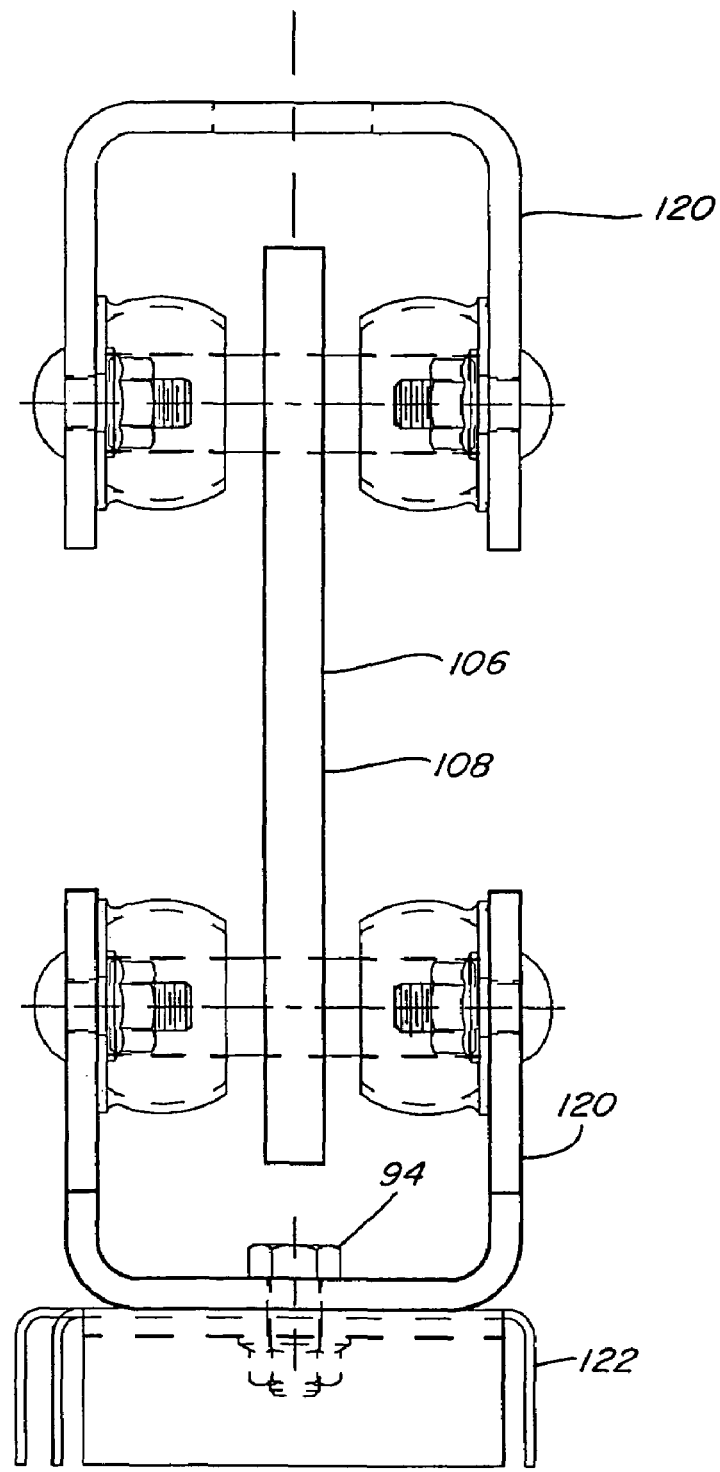
FIG. 14 is another side view of the bellows of FIG. 8.

Referring also to FIG. 14, linkage arrangement 106 is better shown, including brackets 120 which connect to cover member 100 at the bottom and cross member 40 at the top for pivotally connecting those members together. Brackets 120 can be attached directly to cross member 40, and to an end closure 122 which is suitably connected such as by fastening or welding in closing relation to the upper end of cover member 100.

It should be noted that upper and lower bellows 84 and 86 at the rear of module builder 12 are constructed essentially in the above-described manner, and are retained in position and guided by similar guide frames.

Figure 15:
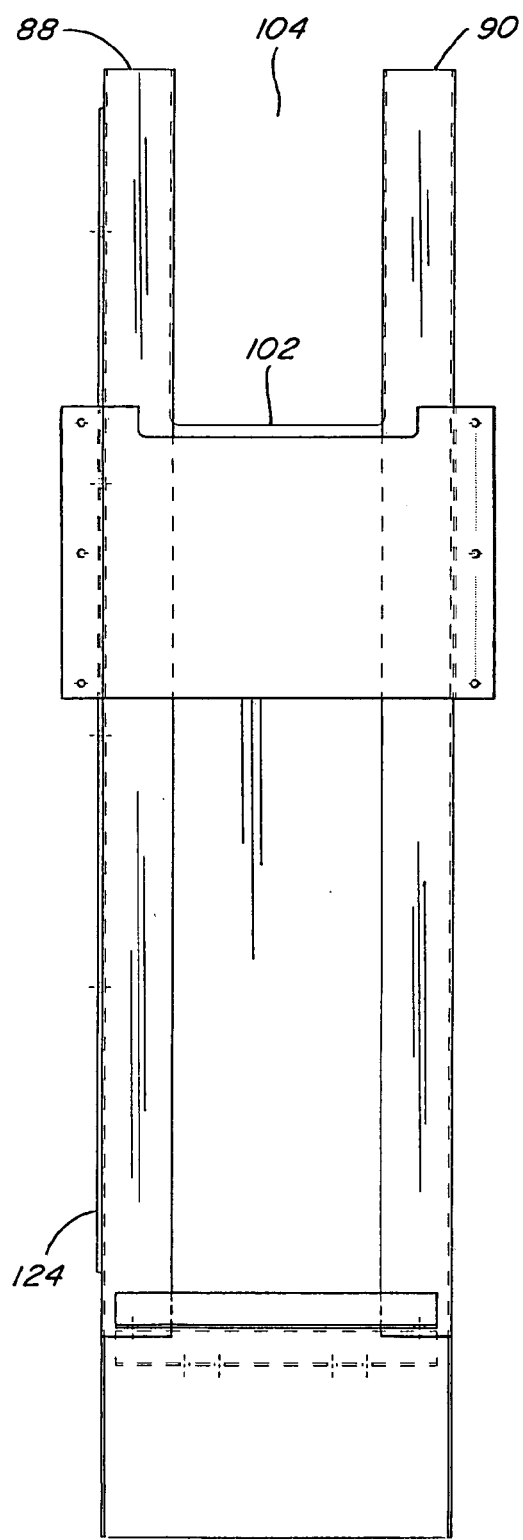
FIG. 15 is a side view of a guide frame for a rear bellows of the invention.
Figure 16:
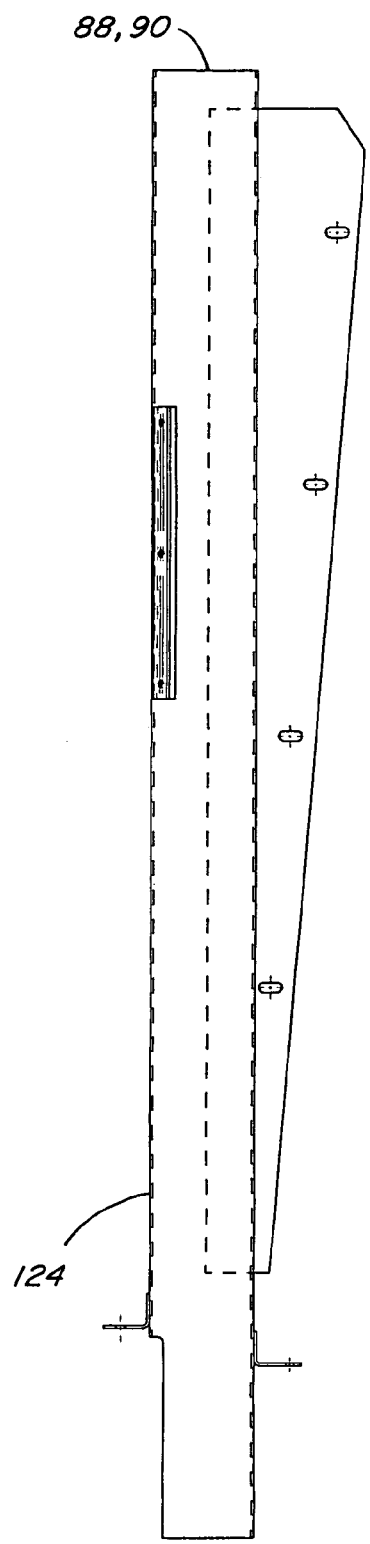
FIG. 16 is an end view of the guide frame of FIG. 15.

Referring also to FIGS. 15 and 16, a representative guide frame 124 for bellows 86 at the rear are shown, including guide channels 88 and 90 defining a space therebetween for receiving C-shape channels 116 for guiding and controlling upward and downward movement of bellows 84 and 86, and also an intermediate panel 102 on the side facing cotton compacting chamber 22 which does not extend the full height of the guide frame, so as to provide an opening 104 for receiving rear cross member 42. Guide frame 124 is attached to rear end wall 128 of the module builder and side wall 30, and frame 60, in the above-described manner.

Here it should be noted that the bellows structure described herein has utility for a wide variety of other compactors, module builders and packagers and other structures, such as those disclosed in the above-referenced U.S. Pat. Nos. 6,530,199 and 6,536,197, and therefore is not intended to be limited to use with the structure described herein.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An on-board cotton module builder for a cotton harvesting machine, comprising:

module builder structure including a floor and walls extending upwardly from opposite peripheral edges of the floor, defining a cotton compacting chamber;

compactor apparatus disposed within the cotton compacting chamber, including a compactor frame having cross members extending across the chamber, each of the cross members having opposite ends which extend through upwardly and downwardly extending passages through the walls, respectively, the ends extending through each of the walls being connected together by side structures located externally of the compacting chamber, at least one driver located externally of each of the walls in connection with the side structures, respectively, the drivers being controllably operable for simultaneously moving the side structures upwardly and downwardly relative to the walls to move the cross members upwardly and downwardly through the passages and the frame upwardly and downwardly within the compacting chamber for compacting cotton in the chamber against the floor;

structures disposed in each of the passages through the walls below the ends of the cross members extending therethrough, respectively, each of the structures including rigid telescoping members which occupy the passage between the end of the cross member and the floor, the telescoping members being telescopically extendible by movement of the end of the cross member upwardly, and telescopically retractable by movement of the end of the cross member downwardly, for preventing entry of cotton into the passage below the end of the cross member; and bellows disposed in each of the passages above the ends of the cross members extending therethrough, respectively, the bellows in each of the passages being retractable by movement of the end of the cross member upwardly in the passage and extendible by downward movement of the end in the passage, for preventing entry of cotton into the passage.

2. The module builder of claim 1, wherein at least one of the telescoping members in each of the passages is connected to the end of the cross member extending through the passage so as to be movable upwardly and downwardly therewith relative to another of the telescoping members.

3. The module builder of claim 1, wherein the module builder structure includes an upper portion telescopically retractable in a lower portion thereof, the passages through the walls being defined, respectively, by the telescoping members which are telescopically retracted by the telescoping retraction of the upper portion of the module builder structure relative to the lower portion thereof.

4. The module builder of claim 1, wherein the rigid telescoping members comprise C-shape members.

5. The module builder of claim 4, wherein the C-shaped telescoping members are disposed between and telescopically guided by opposing C-shape channels.

6. The module builder of claim 1, wherein the rigid telescoping members are disposed between and guided for relative telescoping movement by upstanding guide members mounted to the module builder structure adjacent to opposite sides of each of the passages.

7. The module builder of claim 1, wherein at least one of the telescoping members in each of the passages is pivotally connected to the end of the cross member extending through the passage so as to be movable upwardly and downwardly therewith relative to another of the telescoping members.

8. A cotton module builder for a cotton harvesting machine, comprising:

module builder structure including a floor and opposing side walls extending upwardly from opposite peripheral edges of the floor defining a cotton compacting chamber, the chamber being enclosed at one end by an upwardly extending end wall and at an opposite end by a door, and the opposing side walls having upwardly and downwardly extending opposing slots therethrough adjacent to the opposite ends of the chamber;

compactor apparatus disposed within the cotton compacting chamber, the compactor apparatus including a compactor frame having cross members extending sidewardly across the chamber and including ends extending through the opposing slots through the opposing side walls, respectively, the cross members supporting at least one compactor member extending therebetween, the ends of the cross members extending through the slots through each of the side walls being connected to a side structure supported adjacent thereto and movable upwardly and downwardly relative to the walls to move the cross members upwardly and downwardly through the slots and the frame upwardly and downwardly within the compacting chamber;

upwardly and downwardly telescoping members substantially occupying the slots below the ends of the cross members extending therethrough, respectively, for substantially preventing entry of cotton into the slots below the ends of the cross members; and bellows disposed in each of the slots above the ends of the cross members extending therethrough, respectively, the bellows in each of the slots being retractable by movement of the end of the cross member upwardly in the slot and extendible by downward movement of the end in the slot, for preventing entry of cotton into the slot above the end of the cross member.

9. The module builder of claim 8, wherein at least one of the telescoping members in each of the slots is connected to the end of the cross member extending therethrough so as to be movable upwardly and downwardly therewith relative to another of the telescoping members.

10. The module builder of claim 9, wherein the at least one of the telescoping members is pivotally connected to the end of the cross member to allow relative pivotal movement of the cross member relative to the at least one of the telescoping members.

11. The module builder of claim 8, wherein the module builder structure includes an upper portion telescopically receivable in a lower portion thereof, the slots being defined, respectively, by the telescoping members which are telescopically retracted by the telescoping retraction of the upper portion of the module builder structure into the lower portion thereof.

12. The module builder of claim 8, wherein the telescoping members each have a C-shaped cross section.

13. The module builder of claim 12, wherein the telescoping members are disposed between and guided for telescoping movement by opposing C-shaped channels disposed on opposite sides of the slots, respectively.

14. The module builder of claim 8, wherein the telescoping members are disposed between and guided for relative telescoping movement by upstanding guide members mounted to the module builder structure adjacent to opposite sides of each of the slots.

* * * * *